(12) United States Patent
Schuchardt et al.

(10) Patent No.: US 9,203,692 B1
(45) Date of Patent: *Dec. 1, 2015

(54) OPTIMIZED EVENT ROUTING IN DISTRIBUTED DATA MANAGEMENT

(71) Applicant: Pivotal Software, Inc., Palo Alto, CA (US)

(72) Inventors: Bruce Schuchardt, Newberg, OR (US); Anilkumar M. Gingade, Hillsboro, OR (US); Sudhir Menon, Portland, OR (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,988

(22) Filed: Jul. 3, 2014

Related U.S. Application Data

(63) Continuation of application No. 12/799,900, filed on May 3, 2010, now Pat. No. 8,775,505.

(60) Provisional application No. 61/341,994, filed on Apr. 7, 2010.

(51) Int. Cl.
*G06F 15/173* (2006.01)
*H04L 12/24* (2006.01)
*H04L 29/08* (2006.01)

(52) U.S. Cl.
CPC ............ *H04L 41/0686* (2013.01); *H04L 67/10* (2013.01)

(58) Field of Classification Search
CPC ........................................................ H04L 41/06
USPC ................................................. 709/203, 223
See application file for complete search history.

(56) References Cited

U.S. PATENT DOCUMENTS

| 8,775,505 | B2 | 7/2014 | Schuchardt et al. | |
|---|---|---|---|---|
| 2001/0049717 | A1* | 12/2001 | Freeman et al. | ............... 709/203 |
| 2006/0277180 | A1* | 12/2006 | Okamoto | ........................... 707/7 |
| 2009/0119347 | A1 | 5/2009 | Schuchardt | |

* cited by examiner

*Primary Examiner* — Glenford Madamba
(74) *Attorney, Agent, or Firm* — Fish & Richardson P.C.

(57) ABSTRACT

Event routing in a distributed computing system with distributed data management is optimized by communicating events a datum only to either backup server processes or server processes respectively associated with an application process having an interest in an event affecting the datum.

15 Claims, 3 Drawing Sheets

OPTIMIZED EVENT ROUTING IN DISTRIBUTED DATA MANAGEMENT

CROSS-REFERENCE TO RELATED APPLICATIONS

Not applicable.

BACKGROUND OF THE INVENTION

The present invention relates to distributed computing systems and, more particularly, to event routing in distributed computing systems with distributed data management.

A distributed computing system comprises a network of multiple, often hundreds or even thousands, computing nodes that communicate with each other. The computing nodes of a distributed computing system may comprise autonomous computers or one or more autonomous virtual computers or virtual machines (VMs) that operate on one or more computers. Distributed data management enables the system's data and the processes performed by the distributed computing system to be distributed throughout the many nodes of the system.

A data fabric, such as GemFire Enterprise® data fabric from Gemstone Systems Inc., provides a communication network interconnecting the computing nodes of a distributed computing system. The data fabric provides a data infrastructure that distributes and replicates data enabling data storage to be distributed throughout the nodes of the system and enabling the nodes to exchange and utilize data in the performance of the process(es) executing on the local node. The data fabric enables frequent updating of the data used by a plurality of processes executing on one or more of the distributed computing nodes and enables utilization of the data at high rates with low latency and high availability.

Referring to FIG. 1, typically, in a distributed computer system (20) a datum, for example, datum X (22) is stored by a primary server process (24) operating on one node of the system. In addition, a distributed computing system commonly includes one or more backup server processes, for example, sever process B (26) providing redundant storage of the datum and enabling communication of events to interested applications in the event of failure of the primary server process. The primary and backup sever processes are in communication with a plurality of other server processes operating on other system nodes and are aware of which server processes are serving an application process. Each of the server processes may be in communication with one or more application processes which may or may not utilize the datum to provide an output to a user. Each application process utilizing the datum has an interest in certain events affecting the datum, although the application processes may utilize the datum in different ways and, therefore, may be interested in different events affecting the datum. For example, a datum, the stock price of XYZ Corp., may be stored on primary server process and used by several remote application processes displaying stock prices to users and it may also be used by another process that calculates and displays the values of businesses included in an industry sector. Interest in an event may be expressed in terms of a regular expression, a list of data keys, a structured query language (SQL) statement or in some other way. If an application has an interest in an event, the application registers its interest in the event with its associated server process. For example, application process 4 (38) has registered an interest in event 003 (40) with sever process C (28).

When an event affecting a datum, for example, datum X, occurs in a distributed data management system, the data fabric communicates the event to the various server processes of the system for communication to the application processes that have expressed an interest in the event. An event may include a change in the value of the datum, deletion of the datum or creation of the datum. When an event (42) affecting datum X occurs it is communicated to the primary server process A providing storage for that datum and, if the primary server process is unavailable, the server process, for example, server process B (26), providing backup storage for the datum. The primary server process filters the event to determine if an application process in communication with process A has registered an interest in the event. In addition, primary server process communicates the event to the backup server process(es) and any other server processes which are serving an application process. When a server process receives the event it filters the event to determine which application process associated with the server process has registered an interest in the event. For example, the occurrence of event 001 affecting datum X is communicated to the primary server process A (24) where application process 1 (32) has registered an interest in the event (46). The primary server process filters the event and communicates the event with application process 1. The primary server process also transmits the event (45) to server process B because it is the backup server process and to server processes C and D because they are serving respective application processes. Server process C filters the event to determine that application process 4 (38) is not interested in the event and that application process 3 (36) has registered an interest in the event. Server process C will then communicate event 001 to application process 3. Likewise, server process D filters the event and determines that application process 5 (44) has no interest in the event. Similarly, the primary server process will filter events 002 and 003 and transmit the events to server processes B, C, and D. If the primary server process should fail, the backup server process would communicate events (48) in the same manner to any additional backup server processes and any other server process serving one or more application processes.

In a distributed computing system with large numbers of server processes and, typically, even larger numbers of application processes there are likely many server processes that are not in communication with an application process that has an interest in a particular event and communicating each event to each server process serving an application, without regard to whether the application process associated with the particular server process has an interest in that event, increases the communication burden of the data fabric and slows the distribution of events. Moreover, when an event is communicated to a server process, the server process must compute the interest of its associated applications to determine whether one of the applications with which it communicates has registered an interest in the event. Calculating interest in an event when none of the application processes associated with a particular server is interested in the event is wasteful of sever process resources, increases latency and lowers the throughput of the distributed computing system.

What is desired, therefore, is a method and apparatus for event routing in a distributed computing system with distributed data management that reduces duplication of system processes when an event occurs.

DETAILED DESCRIPTION OF PREFERRED EMBODIMENTS

Figure 2:
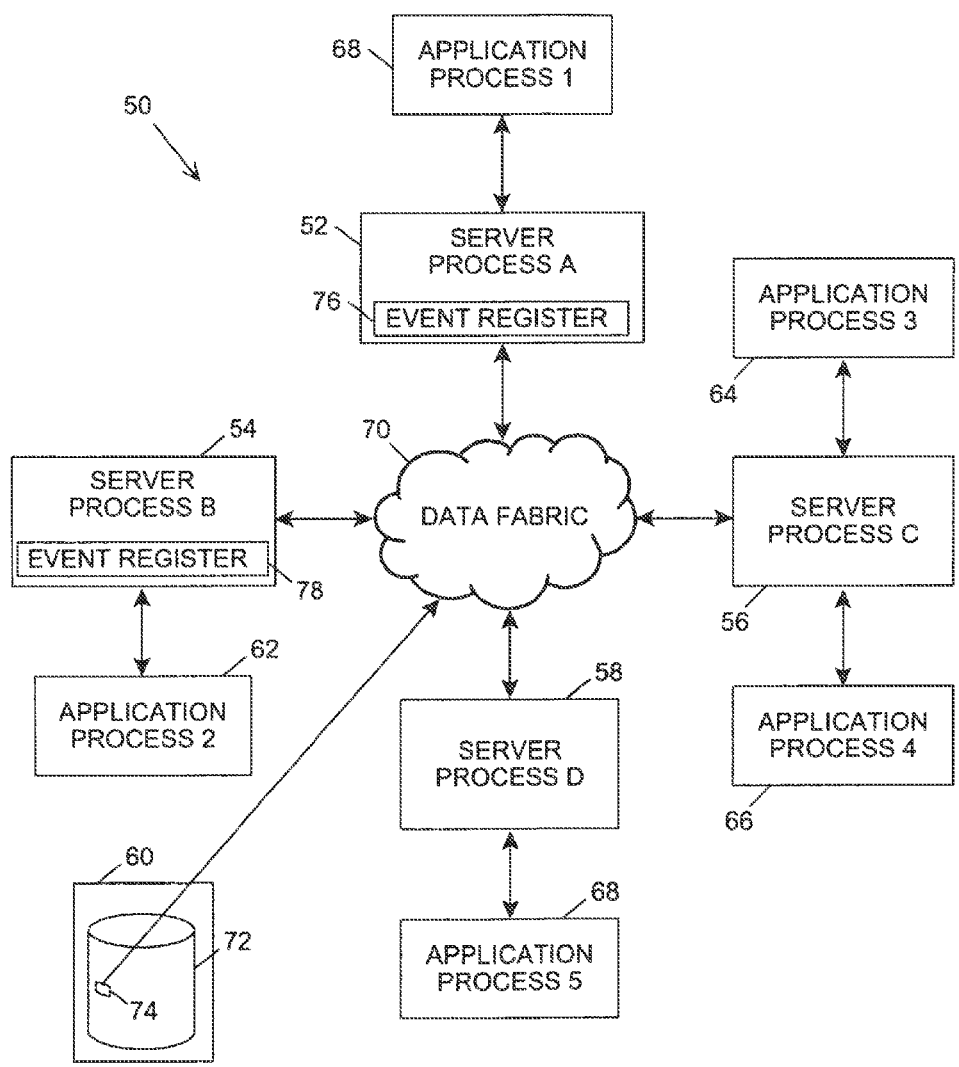
FIG. 2 is a block diagram of a distributed computing system.

Referring in detail to the drawings where similar parts are identified by like reference numerals, and, more particularly to FIG. 2, an exemplary distributed computing system 50 comprises a plurality of computing nodes each hosting one or more the system's processes. Typically, each node comprises an autonomous computer or a virtual computer, also referred to as a virtual machine (VM), one or more of which may be operating autonomously on a computer. Multiple processes may be hosted by a single standalone computer. The exemplary distributed computing system comprises a plurality of computing nodes hosting server processes A (52), B (54), C (56), D (58) and another plurality of nodes hosting application processes 1 (60), 2 (62), 3 (64), 4 (66), 5 (68). Each application process is in communication with or associated with at least one server process. Although the exemplary system includes only a few server and application processes, a distributed computer system may comprise hundreds or even thousands of nodes hosting large numbers of server processes and application processes.

Distributed computer systems commonly employ distributed data management with the data utilized by the application processes distributed among the plurality of server processes of the system. Typically, a datum utilized in the distributed computer system is stored by a primary server process; for example, process A (52), and one or more back-up server processes; for example, process B (54), which will assume the role of the primary server process if server process A fails. Thus, the datum has continuous availability in the event of failure of the primary server process. On the other hand, when an event occurs affecting a datum; such as a change in the value of the datum, creation of the datum or deletion of the datum; various application processes that utilize the datum must be apprised of the event. System communication and coordination is performed by a data fabric (70), distributed data management software that manages the storage of the system's data on the various server processes and the communication between the various application processes and server processes of the system. The data fabric comprises a data structure (74) stored in a portion of the system's memory (72) on one or more of the system's nodes (60).

Figure 1:
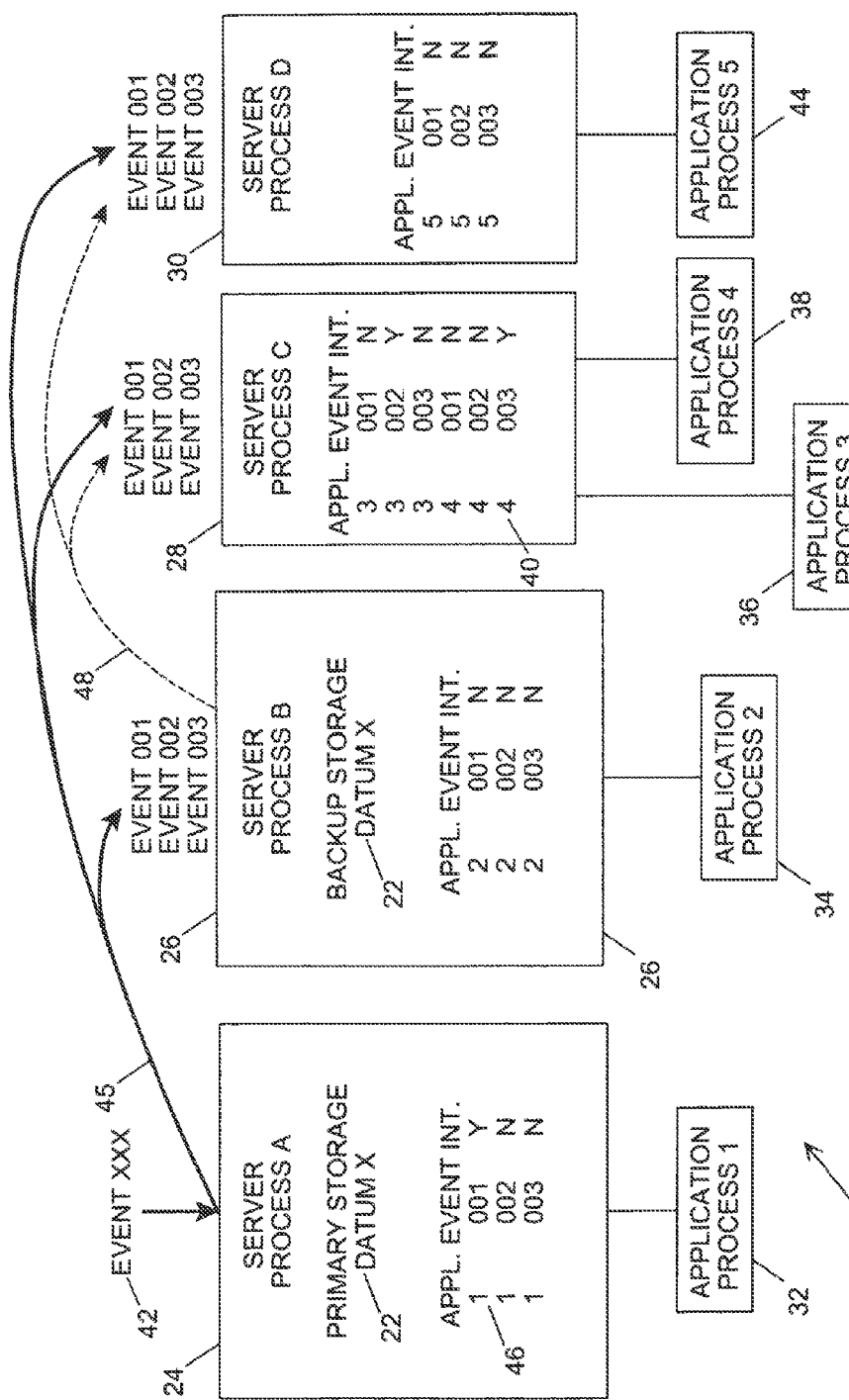
FIG. 1 is a block diagram of event routing in a distributed computing system.

Referring to FIG. 1, when an event occurs affecting a datum stored by a primary server process of a prior art distributed computer system, the event is routed to the server processes of the system which are either providing redundant storage for the datum or which are serving an application process. Each server process receiving the event, including the primary server process and the back-up server process(es), in turn, determines which application process(es) associated with the respective server process is interested in the event and communicates the event to the associated application process(es) that has registered an interest in the event. For example, application processes three and four are in communication with server process C and register with server process C their respective interests, if any, in events affecting a datum stored by primary server process A. When the primary server process communicates an event to server process C, the server process will calculate whether either application process 3 and/or application process 4 has registered an interest in the event and communicate the event to the application(s) that has registered an interest with the server process.

In a distributed computing system with many application processes it is likely that a substantial number of application processes will have no interest in a particular event. Communicating events to multiple server processes that are not associated with an application having an interest in the event and calculating a lack of interest at these server processes can consume a substantial portion of the system's communication and calculation resources adversely effecting the system's timeliness and throughput. The present inventors concluded that the performance of a distributed computer system with distributed data management could be improved if event distribution was optimized by communicating an event only to the backup server process(es) and server processes that are respectively associated with one or more application processes that are interested in the event.

Figure 3:
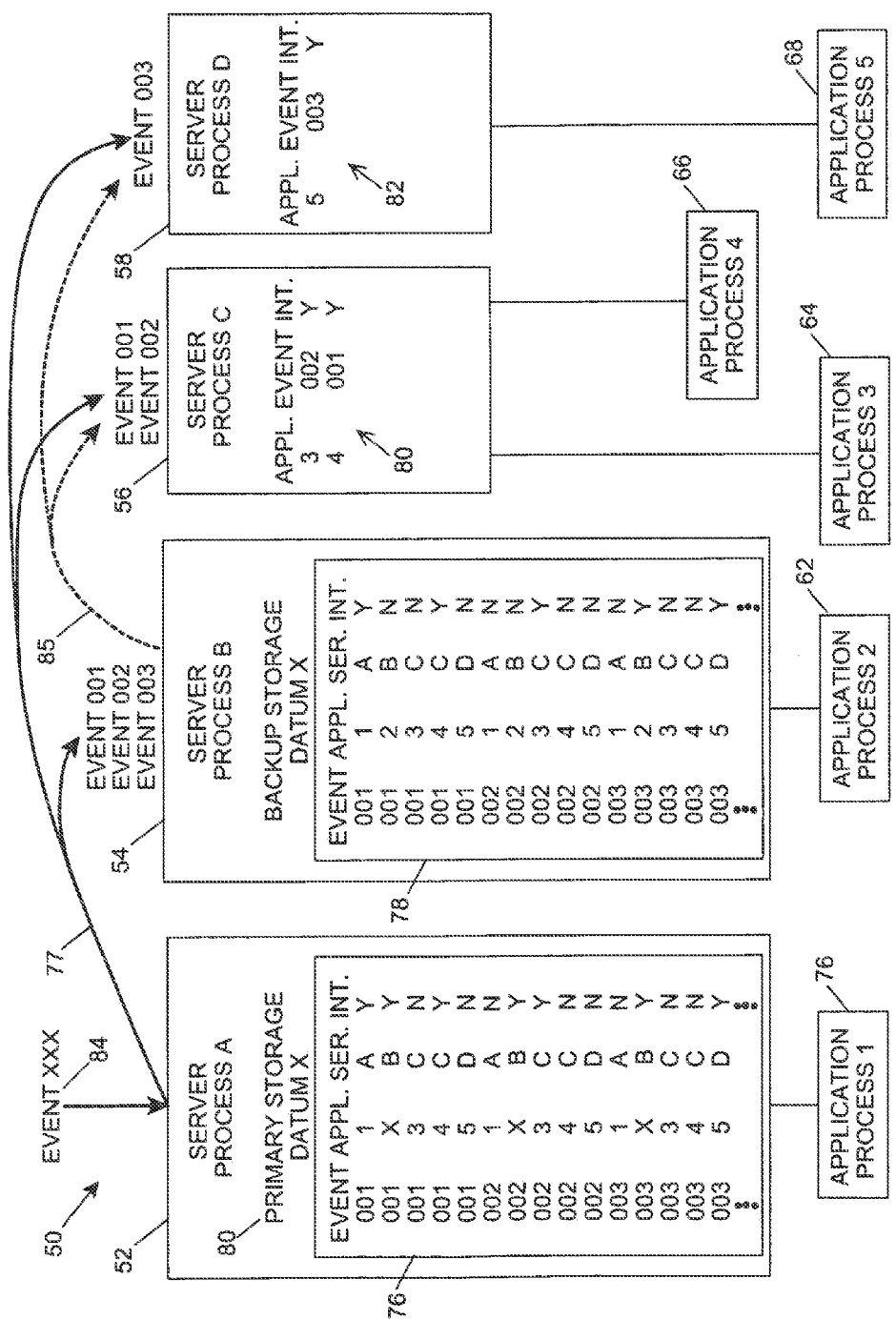
FIG. 3 is a block diagram of optimized event routing in a distributed computing system with distributed data management.

Referring also to FIG. 3, the exemplary distributed computer system 50 with distributed data management and optimized event routing includes a primary server process A (52) that provides primary storage for a datum X (80) and a second server process B (54) that provides redundant storage for datum X. The system also comprises a third server process C (56) and a fourth server process D (58). However, the system might actually comprise many server processes providing storage for substantial numbers of items of data and may include a plurality of backup server processes providing a plurality of layers of redundant storage for datum X and other data in the system. Each of the exemplary sever processes A, B, C and D is associated with one or more application processes although one or more server processes of a distributed computer system may not be associated with an application process.

Several of the application processes of the exemplary system have an interest in events affecting datum X. An event affecting datum X may include a modification of datum X, deletion of datum X or addition of a new datum, datum X, to the system. The interests of the various applications may be expressed in terms of a regular expression, a list of data keys, a structured query language (SQL) statement or in some other manner. While certain of the exemplary application processes are interested in datum, X, the interest of the respective processes in events affecting datum X varies. For example, application processes 1 (60) and 4 (66) are interested in event 001, application process 3 (64) is interested in event 002, and application process 5 is interested in event 003. Application process 2 (62) is not interested in any of exemplary events 001-003. The interest of the application processes, for example, application processes 3, 4 and 5, are registered in an application interest register (80) (82) associated with the server processes C and D serving the respective application processes.

In the exemplary distributed computing system, the interest of each application process in each event is registered by the application's respective associated server process in an event register (76) associated the primary server process A. For example, server process C registers the respective interests of application processes 3 and 4 in the exemplary events, event 002 and 001. Similarly, the interest of each application process that can be served by the backup server process B is registered in an event register (78) associated with server process B. The respective interest and identity of the application and the identity of its respective server process are stored in event registers associated with the primary server process and each backup server process.

When an event (84) occurs, for example, event 001, the primary server process A filters the event register (76) to determine which applications and servers are interested in the event. Application process 1 (60) associated with the primary server process A has registered an interest in event 0001 and the event is communicated to that application. While application process 2 (62) associated with server process B is not interested in the event, all events are transmitted to server process B because of its status as the backup server process. Server process C has registered the interest of application process 4 (66) in event 001 and the primary server communicates (77) the event to that server process. Server process C filters the event, determines the interest of application process 4 and the lack of interest of application process 3 in the event and communicates the event to application process 4. On the other hand, application process 5 associated with server process D has not registered an interest in event 001 in the event register so the event is not communicated to that server process and calculation of the interest of its associated application (68) in event 001 is unnecessary; reducing the burden on the system's communication and calculation resources.

Similarly, when event 002 occurs, it is communicated to the backup server and to server process C which filters the event and transmits the event to application process 3. Since application process 5 associated with server process D has not registered an interest in event 002, neither the primary server process nor, in the event that the primary server process should fail, the backup server process communicates the event to server process D and the server process need not calculate the interest of application process 5 in event 002.

When event 003 occurs the primary server process A filters the event register and transmits the event to backup server process B which receives all events affecting datum X and to server process D which calculates the interest of application process 5 and communicates the event to the application process which has a registered interest in the event. On the other hand, the event is not communicated to server process C because neither of the application processes served by server process C has registered an interest in the event. If the primary server process A should fail, the backup server assumes the role of the primary server process communicating the events (85) to the appropriate server processes in the same manner as server process A, that is, communicating event 003 to server process D but not to server process C.

In a distributed data management system, event routing is optimized by registering the interest of application processes in events with the primary and backup server processes and by initially calculating at the primary server process the interest of each application process having a potential interest in the datum. Since the primary and backup server processes only forward an event to a server process associated with an application process having a registered interest in the event, the magnitude of event communications and the computational burden of the server processes of the system is reduced.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A method, comprising:
   storing, by a primary server process executing on a first node of a distributed computing system, a data item and an event register, the event register comprising a plurality of data records, each of the data record comprising an event identifier, an application identifier, a server process identifier, an application process identifier, and an interest indicator,
   wherein, in each data record:
      the event identifier of the data record represents an event that may affect the data item;
      the server process identifier represents a secondary server process executing on a second node of the distributed computing system, the secondary server process having registered with the primary server process;
      the application process identifier represents an application process executing on the second node and being in communication with or associated with the secondary server process; and
      the interest indicator indicating whether the application process requests notification when the data item is affected by the event represented by the event identifier in the data record; and
   wherein at least one secondary server process represented in the event register is a backup server process; and
   upon occurrence of a first event having a first event identifier, filtering the event register by the primary server process, the filtering comprising:
      notifying each secondary server process represented in a data record in the event register where, as indicated by the interest indicator in the data record, an associated application process represented in the data record requests notification when the first event represented by the first event identifier affects the data item; and
      notifying the backup server process regardless of values of any interest indicator associated with an identifier of the backup server process,
   wherein the distributed computing system comprises one or more processors.

2. The method of claim 1, wherein each event represented in the event register is one of a modification of the data item, a deletion of the data item, or an addition of the data item to the system.

3. The method of claim 1, wherein the backup server process stores, on a backup node, a copy of the event register.

4. The method of claim 3, comprising, upon failure of the primary server process, performing actions of the primary server process by the backup server process, including filtering the copy of the event register by the backup server process.

5. The method of claim 1, wherein notifying each secondary server process and the backup server process comprises transmitting the first event to each respective server process.

6. A non-transitory storage device storing instructions operable to cause a one or more computers to perform operations comprising:
   storing, by a primary server process executing on a first node of a distributed computing system, a data item and an event register, the event register comprising a plurality of data records, each of the data record comprising an event identifier, an application identifier, a server process identifier, an application process identifier, and an interest indicator, wherein, in each data record:
the event identifier of the data record represents an event that may affect the data item;
the server process identifier represents a secondary server process executing on a second node of the distributed computing system, the secondary server process having registered with the primary server process;
the application process identifier represents an application process executing on the second node and being in communication with or associated with the secondary server process; and
the interest indicator indicating whether the application process requests notification when the data item is affected by the event represented by the event identifier in the data record; and
wherein at least one secondary server process represented in the event register is a backup server process; and upon occurrence of a first event having a first event identifier, filtering the event register by the primary server process, the filtering comprising:
notifying each secondary server process represented in a data record in the event register where, as indicated by the interest indicator in the data record, an associated application process represented in the data record requests notification when the first event represented by the first event identifier affects the data item; and
notifying the backup server process regardless of values of any interest indicator associated with an identifier of the backup server process, wherein the distributed computing system comprises one or more processors.

7. The non-transitory storage device of claim 6, wherein each event represented in the event register is one of a modification of the data item, a deletion of the data item, or an addition of the data item to the system.

8. The non-transitory storage device of claim 6, wherein the backup server process stores, on a backup node, a copy of the event register.

9. The non-transitory storage device of claim 8, the operations comprising, upon failure of the primary server process, performing actions of the primary server process by the backup server process, including filtering the copy of the event register by the backup server process.

10. The non-transitory storage device of claim 6, wherein notifying each secondary server process and the backup server process comprises transmitting the first event to each respective server process.

11. A distributed computing system comprising:
one or more processors;
a non-transitory storage device storing instructions operable to cause a one or more processors to perform operations comprising:

storing, by a primary server process executing on a first node of a distributed computing system, a data item and an event register, the event register comprising a plurality of data records, each of the data record comprising an event identifier, an application identifier, a server process identifier, an application process identifier, and an interest indicator, wherein, in each data record:
the event identifier of the data record represents an event that may affect the data item;
the server process identifier represents a secondary server process executing on a second node of the distributed computing system, the secondary server process having registered with the primary server process;
the application process identifier represents an application process executing on the second node and being in communication with or associated with the secondary server process; and
the interest indicator indicating whether the application process requests notification when the data item is affected by the event represented by the event identifier in the data record; and
wherein at least one secondary server process represented in the event register is a backup server process; and upon occurrence of a first event having a first event identifier, filtering the event register by the primary server process, the filtering comprising:
notifying each secondary server process represented in a data record in the event register where, as indicated by the interest indicator in the data record, an associated application process represented in the data record requests notification when the first event represented by the first event identifier affects the data item; and
notifying the backup server process regardless of values of any interest indicator associated with an identifier of the backup server process.

12. The system of claim 11, wherein each event represented in the event register is one of a modification of the data item, a deletion of the data item, or an addition of the data item to the system.

13. The system of claim 11, wherein the backup server process stores, on a backup node, a copy of the event register.

14. The system of claim 13, the operations comprising, upon failure of the primary server process, performing actions of the primary server process by the backup server process, including filtering the copy of the event register by the backup server process.

15. The system of claim 11, wherein notifying each secondary server process and the backup server process comprises transmitting the first event to each respective server process.

* * * * *